United States Patent [19]

Tsujioka et al.

[11] Patent Number: 5,578,361

[45] Date of Patent: Nov. 26, 1996

[54] WATER-REPELLENT COMPOSITE GRAINS, METHOD FOR PRODUCING SAME, AND WATER-REPELLENT ARTICLE USING SAME

[75] Inventors: Shoichi Tsujioka; Hiromi Sugimoto; Yasushi Kita; Naoki Okada, all of Ube, Japan

[73] Assignee: Central Glass Company, Limited, Yamaguchi Prefecture, Japan

[21] Appl. No.: 377,562

[22] Filed: Jan. 24, 1995

[30] Foreign Application Priority Data

Jan. 26, 1994 [JP] Japan .................................. 6-007216

[51] Int. Cl.$^6$ .............................. B05D 1/36; B05D 5/08; B32B 5/16; C23C 16/00; C08K 9/04
[52] U.S. Cl. ..................... 428/144; 427/202; 427/204; 427/205; 427/255.6; 428/407; 428/422
[58] Field of Search ................................... 427/202, 204, 427/205, 255.6; 428/144, 407, 422

[56] References Cited

U.S. PATENT DOCUMENTS

| | | | |
|---|---|---|---|
| 4,772,322 | 9/1988 | Bellis | 264/109 |
| 4,863,762 | 9/1989 | Aramaki | 525/356 |
| 4,961,064 | 10/1990 | Hara | 328/231 |
| 4,983,566 | 1/1991 | Wieserman | 502/401 |

FOREIGN PATENT DOCUMENTS 1-49404  10/1989  Japan .

OTHER PUBLICATIONS

Chemical Abstracts 86:56320.
Chemical Abstracts 88:23711.
Chemical Abstracts 117:70539.

*Primary Examiner*—James C. Cannon
*Attorney, Agent, or Firm*—Keck, Mahin & Cate

[57] ABSTRACT

The invention relates to water-repellent composite grains. Each composite grain includes: a first grain; and a low molecular weight polytetrafluoroethylene (PTFE) covering the first grain. The first grain is higher than the PTFE in mechanical strength. With this, the composite grains are improved in mechanical strength. A water-repellent article is produced by anchoring the composite grains to a substrate through an adhesive layer formed on the substrate. The composite grains are partly exposed on the adhesive layer and partly submerged in the adhesive layer. With this, the water-repellent article is made minutely rough. The water-repellent article is improved in mechanical strength and water repellency.

15 Claims, 3 Drawing Sheets

WATER-REPELLENT COMPOSITE GRAINS, METHOD FOR PRODUCING SAME, AND WATER-REPELLENT ARTICLE USING SAME

BACKGROUND OF THE INVENTION

The present invention relates to water-repellent composite grains, a method for producing the composite grains, and a water-repellent article using the composite grains.

Fluorine-containing resins are superior, for example, in water repellency and stain resistance and practically used in many fields. Polytetrafluoroethylene (PTFE) is one of the most water-repellent fluorine-containing resins.

A fluorine-containing resin which is higher in water repellency, such as PTFE, is worse in adhesion to another material (substrate). Therefore, it becomes difficult to coat a substrate with this resin. Even if a substrate is coated with this resin, the coated surface (water-repellent layer) becomes inferior in abrasion resistance and the like. Hitherto, for the purpose of improving the adhesion strength of a fluorine-containing resin, for example, a major surface of a sheet of PTFE or the like has been treated with metal sodium to activate the major surface, or a major surface of a PTFE sheet has been made rough through glow discharge or the like to anchor the PTFE sheet to a substrate. However, these treatments are complicated, and it is difficult to apply these treatments to a PTFE sheet having a complicated shape.

SUMMARY OF THE INVENTION

It is an object of the present invention to provide water repellent composite grains for covering a substrate with the grains and thus forming a water-repellent layer on the substrate, which grains enable the water-repellent layer to be improved in water repellency and mechanical strength such as abrasion resistance.

It is another object of the present invention to provide a method for producing such water-repellent composite grains.

It is still another object of the present invention to provide a water-repellent article covered with such water-repellent composite grains.

According to a first aspect of the present invention, there is provided a water-repellent composite grain comprising:

a first grain; and a low molecular weight polytetrafluoroethylene covering said first grain, said first grain being higher than said low molecular weight polytetrafluoroethylene in mechanical strength.

According to a second aspect of the present invention, there is provided a method for producing composite grains each comprising a first grain and a low molecular weight polytetrafluoroethylene covering the first grain, said first grain being higher than said polytetrafluoroethylene in mechanical strength, the method comprising the sequential steps of:

(a) covering each first grain with said polytetrafluoroethylene so as to produce the composite grains; and (b) breaking up the composite grains which have gathered into a mass after the step (a) into the composite grains which are separate.

According to a third aspect of the present invention, there is provided a method for producing composite grains each comprising a first grain and a low molecular weight polytetrafluoroethylene covering the first grain, said first grain being higher than said polytetrafluoroethylene in mechanical strength, the method comprising the sequential steps of:

(a) covering each first grain with said polytetrafluoroethylene so as to produce the composite grains; and (b) breaking up the composite grains which have gathered into a mass after the step (a) into fragments of the composite grains such that the fragments are smaller than the first grains in average grain size.

According to a fourth aspect of the present invention, there is provided a water-repellent article comprising:

a substrate;

an adhesive layer formed on said substrate; and a composite grain according to the first aspect of the present invention, said composite grain being anchored to said substrate through said adhesive layer and positioned relative to said adhesive layer such that said composite grain is partly exposed on said adhesive layer and partly submerged in said adhesive layer, thereby making the water-repellent article minutely rough.

According to a fifth aspect of the present invention, there is provided a method for producing a water-repellent article according to the fourth aspect of the present invention, the method comprising the steps of:

(a) forming said adhesive layer on said substrate;

(b) applying said composite grain to said adhesive layer, so that said composite grain floats on the adhesive layer;

(c) pressing down the floated composite grain such that said composite grain is partly exposed on said adhesive layer and partly submerged in said adhesive layer, thereby making the water-repellent article minutely rough; and (d) hardening said adhesive layer.

According to a sixth aspect of the present invention, there is provided a method for producing a water-repellent article according to the fourth aspect of the present invention, the method comprising the steps of:

(a) mixing said composite grain with an adhesive of said adhesive layer so as to prepare a mixture;

(b) applying said mixture to said substrate; and (c) hardening said adhesive layer.

DESCRIPTION OF THE PREFERRED EMBODIMENTS

Figure 1:
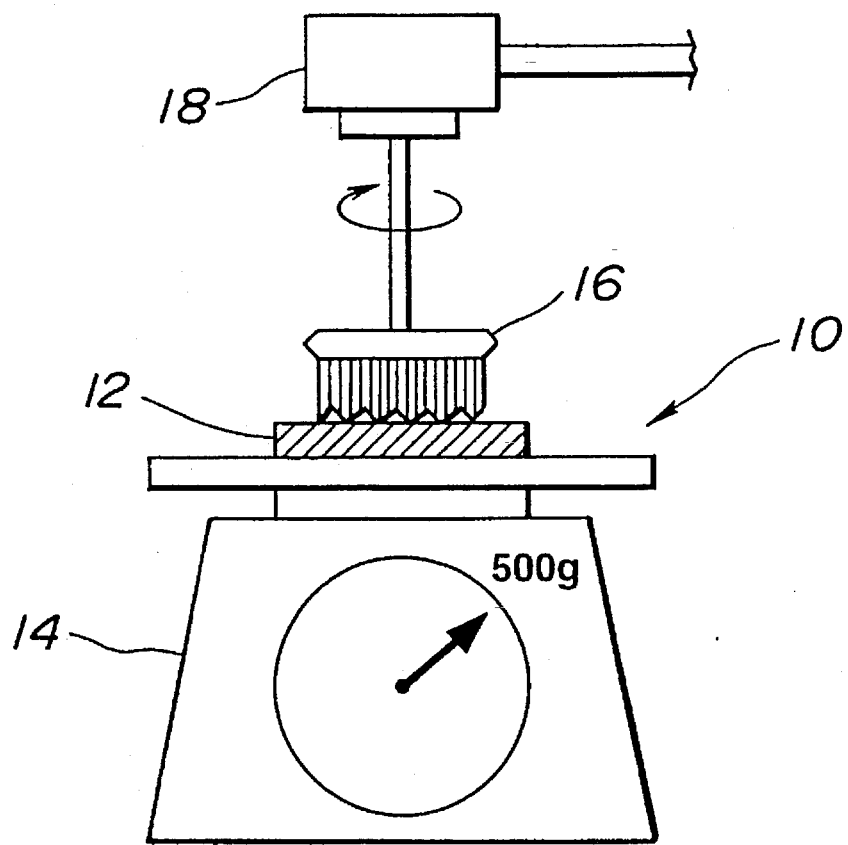
FIG. 1 is a front elevational view showing an apparatus for conducting a mechanical strength test on the water-repellent article.

There are provided water-repellent composite grains according to the present invention for coating a substrate with the grains and for forming a water-repellent layer on the substrate. Each composite grain comprises: a first grain; and a low molecular weight polytetrafluoroethylene (PTFE) covering the first grain. This first grain is higher than the low molecular weight PTFE in mechanical strength. The composite grain is substantially improved in mechanical strength by the use of this first grain.

The first grain is not limited to a specific one as long as it is higher than the low molecular weight PTFE in mechanical strength. Examples of the first grain's material are ceramic materials such as $SiO_2$ and $Al_2O_3$, metal materials such as Fe and Ni, polymer materials such as epoxy resin and polycarbonate, pigments of various paints, carbon materials and inorganic compounds such as $CaF_2$. It is preferable that the first grain is porous in structure. With this, the low molecular weight PTFE is firmly anchored to the first grain. It is preferable that the first grain has an average grain size (diameter) within a range from 0.01 µm to 1 mm. If it is larger than 1 mm, a water drop may penetrate into a space between the two adjacent composite grains of the water-repellent layer formed on the substrate. With this, the water drop may be undesirably held on the water-repellent layer, thereby deteriorating the water repellency.

The low molecular weight PTFE is preferably within a range from 500 to 15,000 and more preferably within a range from 500 to 1,500 in average molecular weight. If it is larger than 15,000, the melt viscosity of the low molecular weight PTFE becomes too high. With this, it becomes difficult to coat the first grain with the low molecular weight PTFE. Furthermore, as compared with a high molecular weight PTFE, the low molecular weight PTFE is superior in water repellency. The low molecular weight PTFE may be prepared by a method according to a Japanese Patent Publication (JP-B-1-49404). In this method, a fluorine-containing polymer is subjected to a contact reaction with at least one selected from the group consisting of molecular fluorine, halogenated fluorides and noble gas fluorides.

In the invention, the water-repellent composite grains are prepared by coating the first grains with the low molecular weight PTFE. This coating may be conducted by either a liquid phase method or a gas phase method. In the liquid phase method, a system for the coating is maintained at a temperature of at least 250° C. for completely melting the low molecular weight PTFE. Thus, this method is not appropriate for a case in which the first grains are coated with a resin or the like that is low in heat resistance. In contrast, it is possible to use the gas phase method for this case. However, an apparatus used in the liquid phase method is much simpler than that used in the gas phase method. Thus, it is considered that the liquid phase method is superior to the gas phase method in an industrial scale production.

In the liquid phase method, at first, the low molecular weight PTFE is heated for melting the same. Then, the first grains are put into the melted PTFE for preparing a mixture. Then, this mixture is sufficiently stirred. With this, the composite grains are formed. Then, the mixture is cooled down to room temperature. Upon this stage, a plurality of the composite grains gather into a mass (aggregate). Then, the gathered composite grains are broken up into the separate composite grains or into fragments of the composite grains with a mill or the like.

In the gas phase method, at first, the low molecular weight PTFE is heated for vaporizing the same. Then, this vaporized PTFE is contacted with the first grains so as to deposit the PTFE (solid) on the first grains and to cover the first grains with the PTFE. Upon this stage, a plurality of the composite grains may gather into a mass in some cases. In these cases, the gathered composite grains are broken into the separate composite grains or into fragments of the composite grains with a mill or the like. If a high molecular weight PTFE is used instead of the low molecular weight PTFE in either of the liquid phase and gas phase methods, it becomes substantially difficult to melt or vaporize the high molecular weight PTFE, as compared with the low molecular weight PTFE.

The composite grains prepared by either the liquid phase method or the gas phase method are applied to and adhered to a surface of a substrate through an adhesive layer by, for example, the following first or second method. The first and second methods are exemplified in the aftermentioned Examples 1–7 and Examples 8–17, respectively.

In the first method, at first, a substrate is covered with an adhesive so as to form an adhesive layer on the substrate. Then, the composite grains are applied to the adhesive layer so as to cover the adhesive layer therewith. Then, the adhesive layer is hardened so as to form a water-repellent layer on the substrate. However, in case of the first method, the composite grains float on the adhesive layer due to a low surface energy of the composite grains, before the adhesive layer is hardened. This lowers the adhesion of the composite grains to the adhesive layer. Therefore, in case of the first method, it is preferable that the floated composite grains are pressed down by adding a certain pressure to the composite grains such that the composite grains are partly exposed on the adhesive layer and partly submerged in the adhesive layer. It is preferable that the adhesive layer is hardened under this condition. With this, a water-repellent layer is formed on the substrate. This water-repellent layer has a minutely rough surface because the composite grains are partly exposed on the adhesive layer. This minutely rough surface makes the contact area between water drops and the surface of the water-repellent layer substantially small. With this, water repellency of this layer is substantially improved, as compared with a conventional case in which only low molecular weight PTFE grains themselves are adhered to a substrate through an adhesive layer. Furthermore, the adhesion of the composite grains to the adhesive layer is substantially improved because the composite grains are partly submerged in the adhesive layer. Still furthermore, the water-repellent layer is substantially improved in mechanical strength such as abrasion resistance due to the use of the first grains. In the above-mentioned conventional case, it is not possible to maintain the minutely rough surface of the water-repellent layer for a long time because the PTFE grains are insufficient in mechanical strength and tend to be easily abraded. Furthermore, in the above conventional case, the submergence of the PTFE grains in the adhesive layer tends to be insufficient. With this, the adhesion of the PTFE grains to the adhesive layer tends to be insufficient.

In the above-mentioned second method, at first, the composite grains are mixed with an adhesive. Then, this mixture is sufficiently stirred so as to obtain a good contact between the composite grains and the adhesive. Then, this mixture is applied to a substrate so as to form a water-repellent layer on the substrate. It should be noted that, according to the second method, the water-repellent layer's surface becomes minutely rough without adding a certain pressure to the composite grains before the adhesive is hardened.

An adhesive of the adhesive layer is not limited to a specific one. Examples of the adhesive are epoxy resins and urethane resins. The shape and material of the substrate are not particularly limited as long as it is possible to coat the substrate with the composite grains. It is preferable that the thickness of the adhesive layer is at least the radius of the composite grain. If it is less than the radius of the composite grain, the adhesion of the composite grains to the substrate becomes insufficient.

It is preferable that the average grain size of the composite grains is not larger than 1 µm for the purpose of more improving the water repellency or making the water-repellent layer transparent. For obtaining the composite grains which are not larger than 1 µm in average grain size, either of the following first and second methods may be taken.

In the first method, the first grains which are not larger than 1 µm in average grain size are prepared and coated with the low molecular weight PTFE so as to prepare the composite grains which are not larger than 1 μm in average grain size. If the composite grains gather into a mass, the mass may be broken up into the separated composite grains of not larger than 1 μm.

In the second method, the first grains which are larger than 1 μm in average grain size are prepared and coated with the low molecular weight PTFE. Then, the composite grains which are larger than 1 μm in average grain size are suitably broken up into fragments of the composite grains such that these fragments are not larger than 1 μm in average grain size. As will be exemplified in Example 17, it should be noted that these fragments are also effective for enabling the water-repellent layer to be improved in water repellency and mechanical strength such as abrasion resistance. It should be noted that the thickness of the PTFE film on the first grain is much smaller than the grain size of the first grain. Therefore, the former is almost negligible as compared with the latter. In other words, the first grains are almost the same as the separate composite grains in average grains size. Thus, the above-mentioned fragments are smaller than the composite grains and also smaller than the first grains in average grain size.

Unlike composite grains according to the present invention, conventional low molecular weight PTFE grains themselves are soft and tend to fuse together. Thus, it is difficult to obtain the PTFE grains which are not larger than 1 μm by general pulverization methods.

The following examples are illustrative of the present invention, but these examples are not limitative.

EXAMPLE 1

In this example, a water-repellent layer was formed on a substrate so as to produce a water-repellent article, as follows.

At first, as shown in Table 1, a low molecular weight PTFE having an average molecular weight of 1,500 was heated at a temperature of 260° C. for melting the same. Then, $SiO_2$ grains (the first grains) which are 10 μm in average grain size and higher than the PTFE in mechanical strength were put into the melted PTFE. The mixing ratio by weight of the PTFE to the first grains was 1:1. Then, this mixture was sufficiently stirred so as to coat the $SiO_2$ grains with the PTFE and to prepare the composite grains. Then, the mixture was allowed to cool down to room temperature. Upon this stage, the composite grains gathered into a mass. Therefore, the gathered composite grains were broken into the separate composite grains with a mortar. Then, a major surface of a glass substrate was covered with a one-package epoxy resin (XNR3501 which is a trade name of Ciba-Geigy Co.) so as to form an adhesive layer on the glass substrate. Then, an excessive amount of the separate composite grains was uniformly applied to the adhesive layer so as to completely cover the adhesive layer therewith. Before the adhesive layer was hardened, a glass plate was placed on the applied composite grains so as to press down and partly submerge the composite grains into the adhesive layer. Then, the adhesive layer was completely hardened at a temperature of 150° C. Then, the excessive composite grains which had not been anchored to the adhesive layer were removed. With this, a water-repellent article according to Example 1 was obtained.

The evaluation of water repellency of this article was conducted by measuring the contact angle of a water drop having a diameter of 2 mm on the article and the angle of water-repellent article with a horizontal line at which a water drop having a diameter of 2 mm starts falling down on the article. The latter angle will be referred to as "falling down angle" in Table 1. The evaluation of durability with respect to water repellency of the article was conducted as follows. At first, an adhesive tape was applied to a portion of the water-repellent layer of the article. Then, the tape was removed from this portion. After that, the contact angle of a water drop having a diameter of 2 mm on this portion was measured. The results of these measurements are shown in Table 1.

EXAMPLES 2–7

In these examples, Example 1 was substantially repeated except in that the average molecular weight of the PTFE, the material and average grain size of the first grains, and the weight ratio of the PTFE to the first grains were modified as shown in Table 1. Furthermore, the heating temperature of the PTFE was modified from 260° C. to 450° C. only in Example 5. Still furthermore, the substrate material was modified in these examples. In fact, an aluminum substrate was used in each of Examples 2–4 and 7; and a nickel substrate was used in each of Examples 5 and 6.

The same measurements as those of Example 1 were conducted on the water-repellent articles according to Examples 2–7 and the following Comparative Example 1. The results are shown in Table 1.

COMPARATIVE EXAMPLE 1

In this comparative example, Example 1 was substantially repeated except in that an aluminum substrate was used instead of the glass substrate, and that the first grains were omitted. In other words, only low molecular weight PTFE grains having an average molecular weight of 1,500 and an average grain size of 1 μm were used instead of the composite grains.

COMPARATIVE EXAMPLE 2

In this comparative example, an attempt to pulverize the low molecular weight PTFE grains according to Comparative Example 1 was conducted as follows to examine whether or not it is possible to pulverize the PTFE grains themselves to grains which are not larger than 1 μm in average grain size and whether or not the pulverized PTFE grains enable the water-repellent article to improve its water repellency.

At first, the low molecular weight PTFE grains of Comparative Example 1 were dispersed in n-hexane. This disperse system was put in a ball mill made of alumina. Then, this ball mill was operated for 5 hr. Then, the PTFE grains were taken out from the ball mill and observed with SEM. With this observation, it was confirmed that the PTFE grains after the treatment in the ball mill were not pulverized at all and still had an average grain size of 1 μm as is the same as that of Comparative Example 1. Thus, a water-repellent article was not prepared, and its water repellency was not measured.

TABLE 1

| | PTFE Molecular Weight | First Grains Material | First Grains Grain Size | PTFE: First Grains (Weight Ratio) | Contact Angle (°) | Falling Down Angle (°) | Contact Angle after Tape Removal (°) |
| --- | --- | --- | --- | --- | --- | --- | --- |
| Ex. 1 | 1,500 | $SiO_2$ | 10 μm | 1:1 | 160 | 5 | 160 |
| Ex. 2 | 1,500 | Alumina | 10 μm | 2:1 | 160 | 5 | 160 |
| Ex. 3 | 1,500 | Alumina | 300 μm | 2:1 | 160 | 10 | 160 |
| Ex. 4 | 1,500 | $SiO_2$ | 0.01 μm | 10:1 | 160 | 5 | 160 |
| Ex. 5 | 15,000 | Activated C* | 300 μm | 2:1 | 160 | 10 | 160 |
| Ex. 6 | 500 | Ni | 300 μm | 2:1 | 160 | 10 | 160 |
| Ex. 7 | 1,500 | Alumina | 1 mm | 2:1 | 160 | 20 | 160 |
| Com. Ex. 1 | 1,500 | — | — | — | 160 | 10 | 90 |

*Activated C: Activated Carbon

EXAMPLE 8

In this example, a water-repellent layer was formed on a substrate so as to produce a water-repellent article, as follows.

The composite grains were prepared by substantially the same method as that of Example 1 except in that the material and average grain size of the first grains were modified as shown in Table 2. Then, the thus prepared composite grains were mixed with butyl acetate as an organic solvent to have a weight ratio of the composite grains to butyl acetate of 1:1. Then, a one-package epoxy resin (XNR3501 which is a trade name of Ciba-Geigy Co.) as an adhesive was added to the mixture to have a weight ratio of the composite grains to the adhesive of 1:1, and then this mixture was sufficiently stirred. This mixture was applied to a glass substrate. The thus coated glass substrate was heated at a temperature of 150° C. for completely hardening the adhesive. With this, a water-repellent article according to Example 8 was prepared.

The evaluation of water repellency of this article was conducted by measuring the contact angle of a water drop having a diameter of 2 mm on the article.

Figure 2:
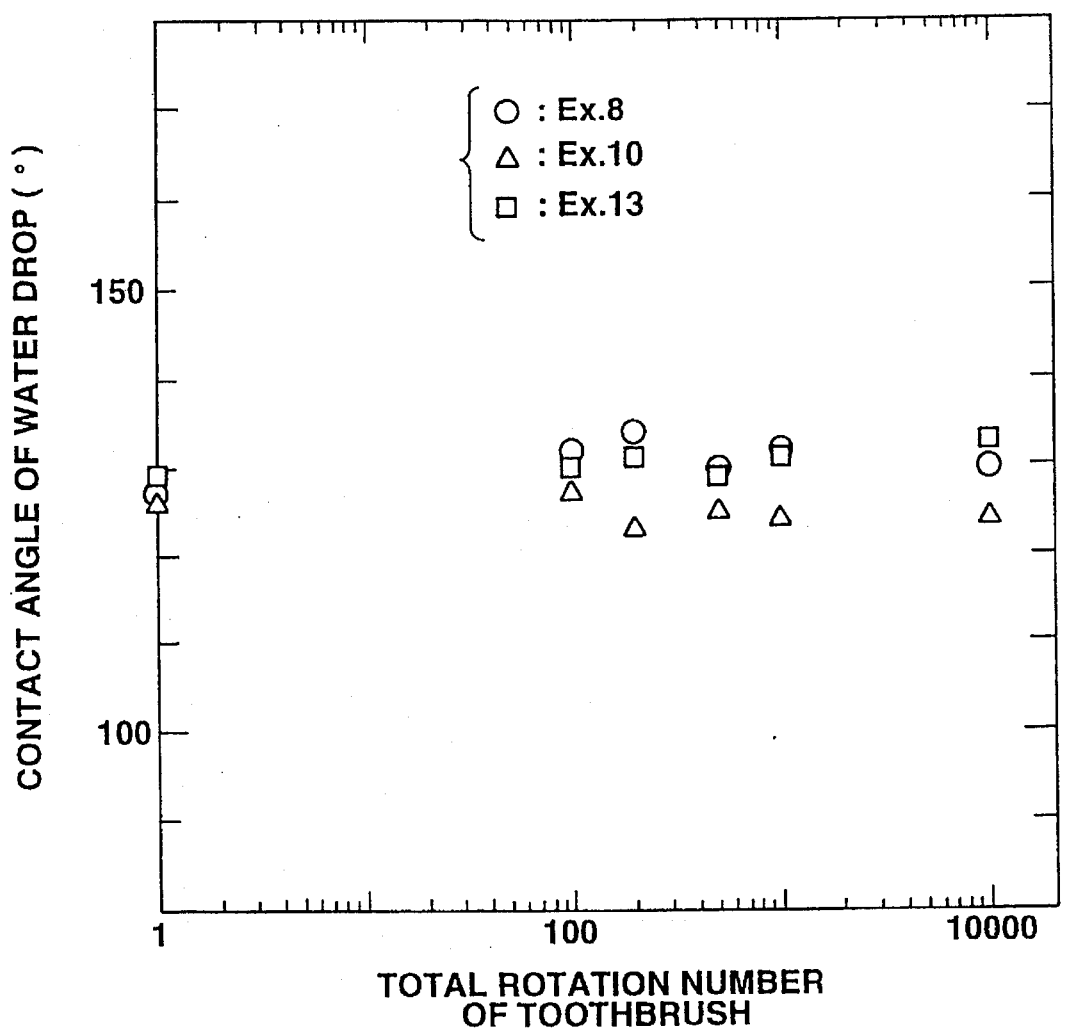
FIG. 2 is a graph showing relationships between the contact angle of a water drop on the water-repellent layer after the mechanical strength test and the total rotation number of a tooth brush in the mechanical strength test, with respect to Examples 8, 10 and 13.
Figure 3:
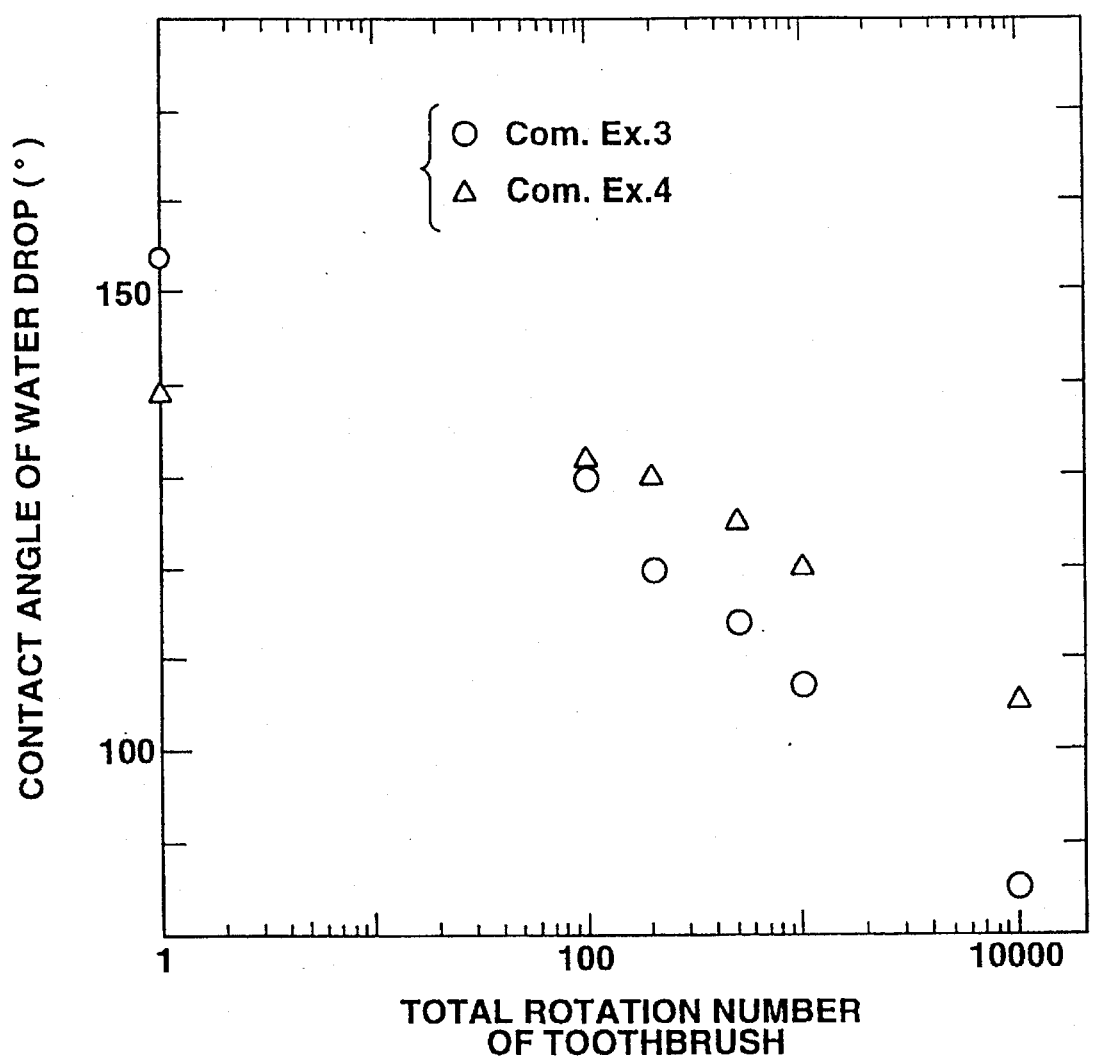
FIG. 3 is a graph which is similar to FIG. 2, but with respect to Comparative Examples 3 and 4.

The evaluation of durability with respect to water repellency of the article was conducted as follows. With reference to FIG. 1, there is provided an apparatus 10 for conducting a mechanical strength test. In this test, at first, the article 12 was placed on a platform scale 14. Then, a toothbrush 16 without its handle portion was rotated certain predetermined times (see FIGS. 2 and 3) on the water-repellent layer of the article 12 with a load of about 500 g by a rotator 18. After the rotation, the contact angle of a water drop having a diameter of 2 mm on a portion of the article, where the toothbrush 14 had been rotated thereon, was again measured. The results are shown in Table 2 and FIG. 2.

EXAMPLES 9–17

In these examples, Example 8 was substantially repeated except in that the average molecular weight of the PTFE, the material and average grain size of the first grains, and the weight ratio of the PTFE to the first grains were modified as shown in Table 2. Furthermore, the heating temperature of the PTFE was modified from 260° C. to 450° C. only in Example 15.

The same measurements as those of Example 8 were conducted on the water-repellent articles according to Examples 9–17. The results are shown in Table 2, and in FIG. 2 with respect to Examples 10 and 13.

In Example 12, when the mixture of the first grains ($SiO_2$) and the PTFE was cooled down to room temperature, the composite grains gathered into a mass. Then, the gathered composite grains were broken up into the separate grains with a mortar. The separate composite grains had an average grain size of 0.01 μm, as is the same as that of the first grains.

In Example 17, when the mixture of the first grains (zeolite) and the PTFE was cooled down to room temperature, the composite grains gathered into a mass. Then, the gathered composite grains were broken up into fragments of the composite grains by the method according to Comparative Example 2. These fragments had an average grain size of 0.2 μm.

EXAMPLE 18

In this example, the evaluations of water repellency and durability with respect to water repellency according to Example 8 were conducted on the water-repellent article prepared in accordance with Example 1. The results are shown in Table 2.

COMPARATIVE EXAMPLE 3

In this comparative example, Example 8 was substantially repeated except in that the first grains were omitted. In other words, low molecular weight PTFE grains having an average molecular weight of 1,500 and an average grain size of 1 μm were used instead of the composite grains. The adhesive of Example 8 was added to the mixture of the PTFE and the organic solvent to have a weight ratio of the PTFE to the adhesive of 1:1.

The same measurements as those of Example 8 were conducted on the water-repellent articles according to Comparative Examples 3 and 4. The results are shown in Table 2 and FIG. 3.

COMPARATIVE EXAMPLE 4

In this comparative example, Example 8 was substantially repeated except in that the PTFE grains and zeolite grains having an average grain size of 8 μm were mixed together at room temperature, and that this mixture was used instead of the composite grains. The adhesive of Example 8 was added to this mixture to have a weight ratio of this mixture to the adhesive of 1:1.

TABLE 2

| | PTFE Molecular Weight | First Grains Material | First Grains Grain Size | PTFE:First Grains (Weight Ratio) | Contact Angle (°) Before Test | Contact Angle (°) After Test (10,000 Rotations) |
|---|---|---|---|---|---|---|
| Ex. 8 | 1,500 | Zeolite | 8 μm | 1:1 | 127 | 130 |
| Ex. 9 | 1,500 | Activated C* | 300 μm | 1:1 | 125 | 128 |
| Ex. 10 | 1,500 | SiO$_2$ | 10 μm | 1:1 | 127 | 123 |
| Ex. 11 | 1,500 | Ni | 300 μm | 2:1 | 143 | 146 |
| Ex. 12 | 1,500 | SiO$_2$ | 0.01 μm | 2:1 | 152 | 147 |
| Ex. 13 | 1,500 | Alumina | 10 μm | 1:1 | 129 | 133 |
| Ex. 14 | 1,500 | Alumina | 300 μm | 1:1 | 132 | 128 |
| Ex. 15 | 15,000 | Zeolite | 8 μm | 1:1 | 123 | 127 |
| Ex. 16 | 500 | Zeolite | 8 μm | 1:1 | 131 | 129 |
| Ex. 17 | 1,500 | Zeolite | 8 μm | 1:1 | 141 | 143 |
| Ex. 18 | 1,500 | SiO$_2$ | 10 μm | 1:1 | 160 | 160 |
| Com. Ex. 3 | 1,500 | — | — | — | 154 | 85 |
| Com. Ex. 4 | 1,500 | Zeolite | 8 μm | 1:1 | 139 | 105 |

*Activated C: Activated Carbon

What is claimed is:

1. A water-repellent composite grain comprising:
   a first grain which is selected from the group consisting of silica, zeolite and activated carbon; and
   a low molecular weight polytetrafluoroethylene covering said first grain, said first grain being higher than said low molecular weight polytetrafluoroethylene in mechanical strength.

2. A composite grain according to claim 1, wherein said first grain has an average grain size within a range from 0.01 μm to 1 mm.

3. A composite grain according to claim 2, wherein said first grain has an average grain size within a range from 0.01 μm to 1 μm.

4. A composite grain according to claim 1, wherein said polytetrafluoroethylene has an average molecular weight within a range from 500 to 15,000.

5. A composite grain according to claim 1, wherein said first grain is porous in structure such that said polytetrafluoroethylene is firmly anchored to said first grain.

6. A method for producing composite grains each comprising a first grain and a low molecular weight polytetrafluoroethylene covering the first grain, said first grain being higher than said polytetrafluoroethylene in mechanical strength, the method comprising the sequential steps of:
   (a) covering each first grain, which is a member selected from the group consisting of silica, zeolite and activated carbon, with said polytetrafluoroethylene so as to produce the composite grains; and
   (b) breaking up the composite grains which have gathered into a mass after the step (a) into the composite grains which are separate.

7. A method for producing composite grains each comprising a first grain and a low molecular weight polytetrafluoroethylene covering the first grain, said first grain being higher than said polytetrafluoroethylene in mechanical strength, the method comprising the sequential steps of:
   (a) covering each first grain with said polytetrafluoroethylene so as to produce the composite grains; and
   (b) breaking up the composite grains which have gathered into a mass after the step (a) into the composite grains which are separate,
   wherein, at the step (a), the polytetrafluoroethylene is heated so as to melt the same, and then the first grains are put into the melted polytetrafluoroethylene so as to cover the first grains with the polytetrafluoroethylene.

8. A method for producing composite grains each comprising a first grain and a low molecular weight polytetrafluoroethylene covering the first grain, said first grain being higher than said polytetrafluoroethylene in mechanical strength, the method comprising the sequential steps of:
   (a) covering each first grain with said polytetrafluoroethylene so as to produce the composite grains; and
   (b) breaking up the composite grains which have gathered into a mass after the step (a) into the composite grains which are separate,
   wherein, at the step (a), the polytetrafluoroethylene is heated so as to vaporize the same, and then the vaporized polytetrafluoroethylene is contacted with the first grains so as to deposit the polytetrafluoroethylene on the first grains and to cover the first grains with the polytetrafluoroethylene.

9. A method for producing composite grains each comprising a first grain and a low molecular weight polytetrafluoroethylene covering the first grain, said first grain being higher than said polytetrafluoroethylene in mechanical strength, the method comprising the sequential steps of:
   (a) covering each first grain with said polytetrafluoroethylene so as to produce the composite grains; and
   (b) breaking up the composite grains which have gathered into a mass after the step (a) into fragments of the composite grains such that the fragments are smaller than the first grains in average grain size.

10. A method according to claim 9, wherein, at the step (a), the polytetrafluoroethylene is heated so as to melt the same, and then the first grains were put into the melted polytetrafluoroethylene so as to cover the first grains with the polytetrafluoroethylene.

11. A method according to claim 9, wherein, at the step (a), the polytetrafluoroethylene is heated so as to vaporize the same, and then the vaporized polytetrafluoroethylene is contacted with the first grains so as to deposit the polytetrafluoroethylene on the first grains and to cover the first grains with the polytetrafluoroethylene.

12. A water-repellent article comprising:
   a substrate;
   an adhesive layer formed on said substrate; and
   a composite grain comprising:
   a first grain; and
   a low molecular weight polytetrafluoroethylene covering said first grain, said first grain being higher than said low molecular weight polytetrafluoroethylene in mechanical strength, said composite grain being anchored to said substrate through said adhesive layer and positioned relative to said adhesive layer such that said composite grain is partly exposed on said adhesive layer and partly submerged in said adhesive layer, thereby making the water-repellent article minutely rough.

13. An article according to claim 12, wherein said adhesive layer has a thickness which is at least a radius of said composite grain.

14. A method for producing a water-repellent article according to claim 12, comprising the steps of:
(a) forming said adhesive layer on said substrate;
(b) applying said composite grains to said adhesive layer, so that said composite grains float on the adhesive layer;
(c) pressing down the floated composite grains such that the composite grains are partly exposed on said adhesive layer and partly submerged in said adhesive layer, thereby making the water-repellent article minutely rough; and
(d) hardening said adhesive layer.

15. A method for producing a water-repellent article according to claim 12, the method comprising the steps of:
(a) mixing said composite grains with an adhesive of said adhesive layer so as to prepare a mixture;
(b) applying said mixture to said substrate; and
(c) hardening said adhesive layer.

* * * * *